United States Patent
Nunez

(10) Patent No.: US 12,268,337 B1
(45) Date of Patent: Apr. 8, 2025

(54) ICE-BREAKING DEVICE AND METHOD

(71) Applicant: Rafael Anthony Nunez, Fremont, CA (US)

(72) Inventor: Rafael Anthony Nunez, Fremont, CA (US)

( * ) Notice: Subject to any disclaimer, the term of this patent is extended or adjusted under 35 U.S.C. 154(b) by 219 days.

(21) Appl. No.: 17/332,780

(22) Filed: May 27, 2021

Related U.S. Application Data

(60) Provisional application No. 63/058,325, filed on Jul. 29, 2020.

(51) Int. Cl.
*A47J 43/27* (2006.01)
*B01F 33/501* (2022.01)
*B01F 35/32* (2022.01)
*F25C 5/04* (2006.01)

(52) U.S. Cl.
CPC ......... *A47J 43/27* (2013.01); *B01F 33/50111* (2022.01); *B01F 35/32021* (2022.01); *F25C 5/043* (2013.01)

(58) Field of Classification Search
CPC ............... A47J 43/27; B01F 33/50111; B01F 35/32021; B01F 35/351; F25C 5/043
USPC ................... 241/DIG. 17; 366/130
See application file for complete search history.

(56) References Cited

U.S. PATENT DOCUMENTS

| | | | | |
|---|---|---|---|---|
| 2,007,850 A * | 7/1935 | Drew | ...... | A47J 43/27 366/256 |
| 2,181,612 A * | 11/1939 | Smith | ...... | A47J 43/27 222/386 |
| 2,258,524 A * | 10/1941 | Vigurs | ...... | A47J 43/27 222/464.2 |
| 3,920,226 A * | 11/1975 | Walt | ...... | A47J 43/27 206/219 |
| 2012/0147693 A1* | 6/2012 | Bahlenhorst | ...... | A47J 43/27 241/98 |
| 2013/0163370 A1* | 6/2013 | Shaifer | ...... | A47J 43/27 366/130 |
| 2013/0280385 A1* | 10/2013 | Arns | ...... | A47J 43/27 426/100 |

* cited by examiner

*Primary Examiner* — Adam J Eiseman
*Assistant Examiner* — Jared O Brown
(74) *Attorney, Agent, or Firm* — Plager Schack LLP; Mark H. Plager, Esq.; Naomi Mann, Esq.

(57) ABSTRACT

A device for breaking up frozen substance in a drink comprises a springy sheet with a plurality of shaving elements protruding from the sheet, wherein the sheet is configured to orient in a curled configuration for insertion into a container such as a cocktail shaker, and wherein the sheet is further configured to expand to press itself up against the interior surface of the container, such that the sheet maintains a fixed position within the container during shaking of the container, without extraneous attachment elements. In some embodiments, each of the shaving elements includes a combination of rounded cutting edges and straight cutting edges.

12 Claims, 5 Drawing Sheets

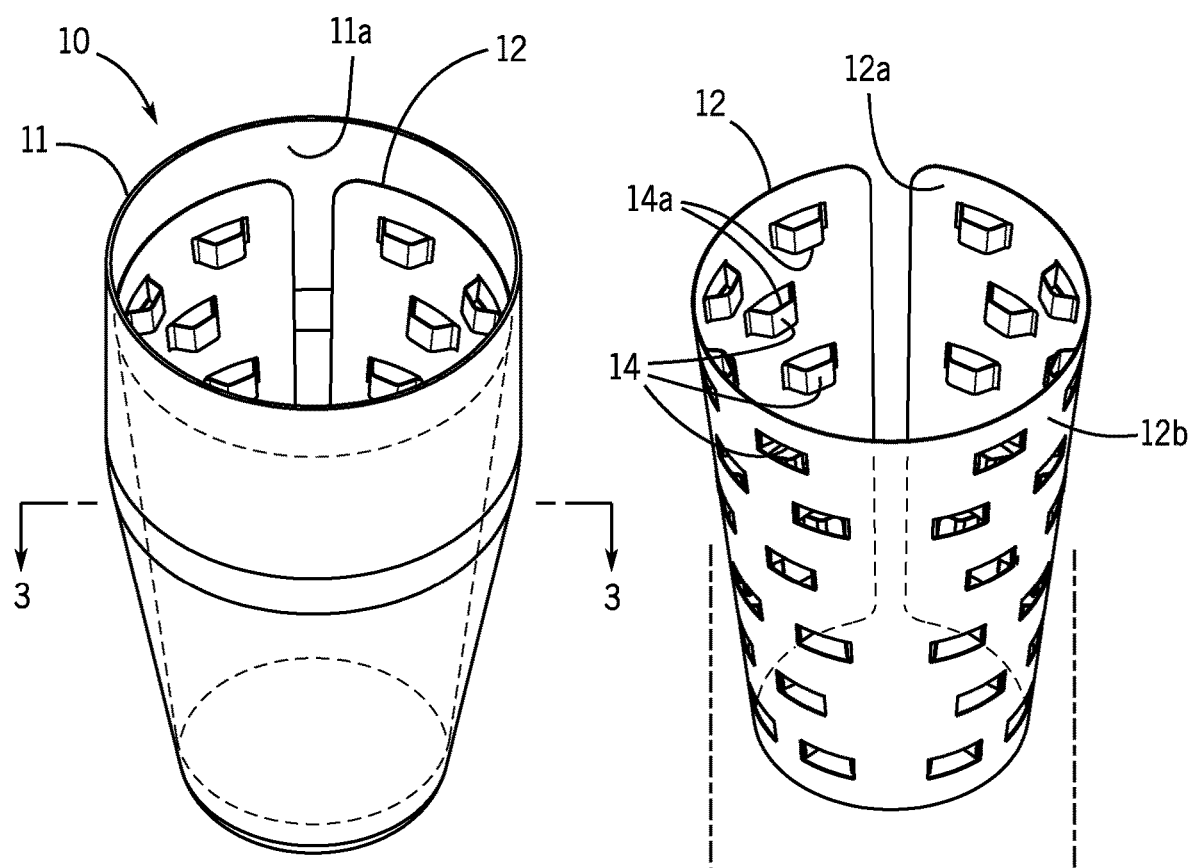
FIG. 1
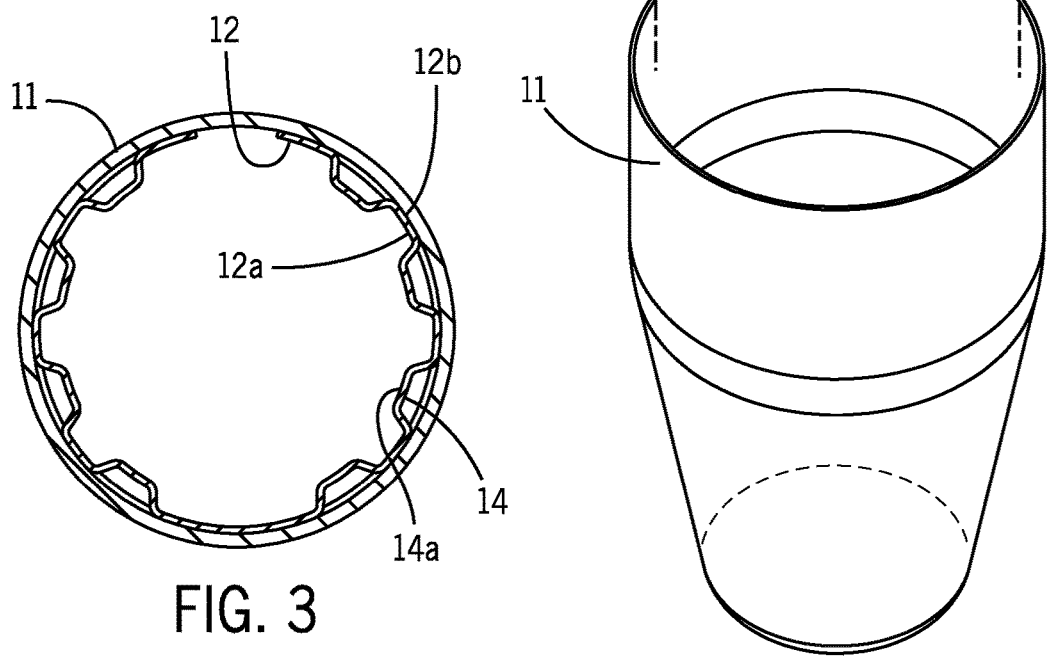
FIG. 3
FIG. 2

ICE-BREAKING DEVICE AND METHOD

RELATED APPLICATION

This application claims priority to provisional patent application U.S. Ser. No. 63/058,325 filed on Jul. 29, 2020, the entire contents of which is herein incorporated by reference.

BACKGROUND

The embodiments herein relate generally to cocktail preparation devices and methods.

Cocktail drinks are often prepared using a container known as a shaker, which may be agitated by hand to mix the contents of the drink. Additionally, cocktail drinks are typically served cold with ice. It is sometimes desirable to break the ice into smaller pieces to provide ice chips or shaved ice within the drink, and/or for more effective cooling of the drink.

As such, a convenient system for providing broken ice for cocktail drinks is desirable.

SUMMARY

According to various embodiments, disclosed is a system for adding broken or shaved ice to drinks. The disclosed system provides an ice-breaking device or sleeve which is configured to insert into a container such as a cocktail shaker. The shaker with the inserted sleeve may then be used to break and/or shave ice chips from larger ice pieces contained in the shaker, by agitating or shaking the shaker by hand. The smaller ice pieces may be more effective in cooling the drink, and may create an ice film on the surface of the drink. In further embodiments, the disclosed system may be used to incorporate shavings of other frozen substance, such as fruit (e.g. watermelon, lemons, strawberries), or vegetables, into the drink.

In embodiments, the disclosed sleeve may comprise sharp openings or raised shaving elements that are configured to break up the ice during shaking. In some embodiments, the raised shaving elements may each have a combination of straight sharp edge(s) and rounded edge)s) on both the top and bottom sides of the shaving elements. In further embodiments, the sleeve may easily be inserted and removed from the shaker, and does not require additional attachment elements for use.

BRIEF DESCRIPTION OF THE FIGURES

The detailed description of some embodiments of the invention is made below with reference to the accompanying figures, wherein like numerals represent corresponding parts of the figures.

FIG. 1 is a perspective view of an ice-breaking sleeve shown inserted within the shaker and in a bent or curled orientation, according to certain embodiments;

FIG. 2 is an exploded perspective view of FIG. 1, showing the ice-breaking sleeve in the curled orientation;

FIG. 3 is a cross-sectional view taken along line 3-3 of FIG. 1;

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

Figure 9:
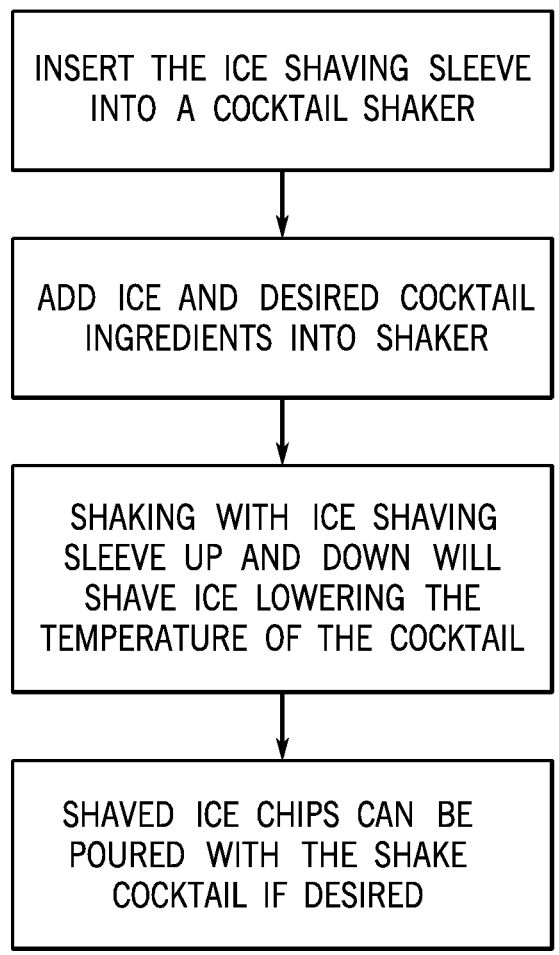
FIG. 9 is a flowchart for an ice-breaking method.

According to various embodiments as depicted in FIGS. 1-9, disclosed is a system 10 for breaking up ice or other frozen food substance (i.e. fruit, vegetable), which may be used for drinks. In embodiments, system 10 comprises an ice-breaking device or sleeve 12, configured to insert into a container 11, and to create an ice breaking wall within the container. According to an exemplary method 20 as depicted in FIG. 9, a user may insert the ice-breaking sleeve 12 into container 11 (e.g. cocktail shaker), and add ice and/or other frozen substance together with the desired drink or cocktail ingredients into the container. The user may then seal and shake the container to shave and/or break the frozen substance into smaller pieces, chips, and/or shavings within the drink. The broken up frozen substance may lower the temperature more effectively than larger pieces, and may further create a layer of ice particles or shavings on the surface of the cocktail to provide a more desirable and enhanced drink.

According to various embodiments, ice-breaking sleeve 12 may be configured for insertion into a container 11 which is configured to retain a liquid, i.e. drink. In certain embodiments, the container 11 may have a circular cross section. In further embodiments, the container may have a cylindrical or tapered cylindrical (frusto-conical) geometry. An exemplary container 11 as depicted FIGS. 1-3 may be a cocktail shaker (e.g. a single and/or Boston style shaker, which may be insulated or non-insulated). Such container may be metallic and have tapered cylindrical geometry, according to certain embodiments. Container 11 may further include a lid (not shown) configured to prevent liquid from spilling when shaking. It is noted that some shakers may employ a cup which may be placed over the mouth of the container and used as a lid, while other shakers may include a lid of various designs that has an attachment mechanism for securement to the container. However, the shaker/container may be provided in various shapes, sizes, geometric, and/or design configurations.

Figure 4:
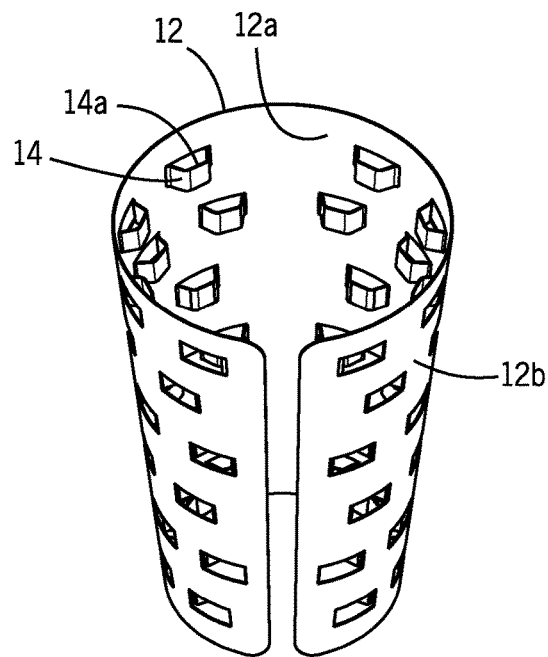
FIG. 4 is an opposite side perspective view of the ice-breaking sleeve, wherein the ice-breaking sleeve is shown removed from the cup and curled.
Figure 5A:
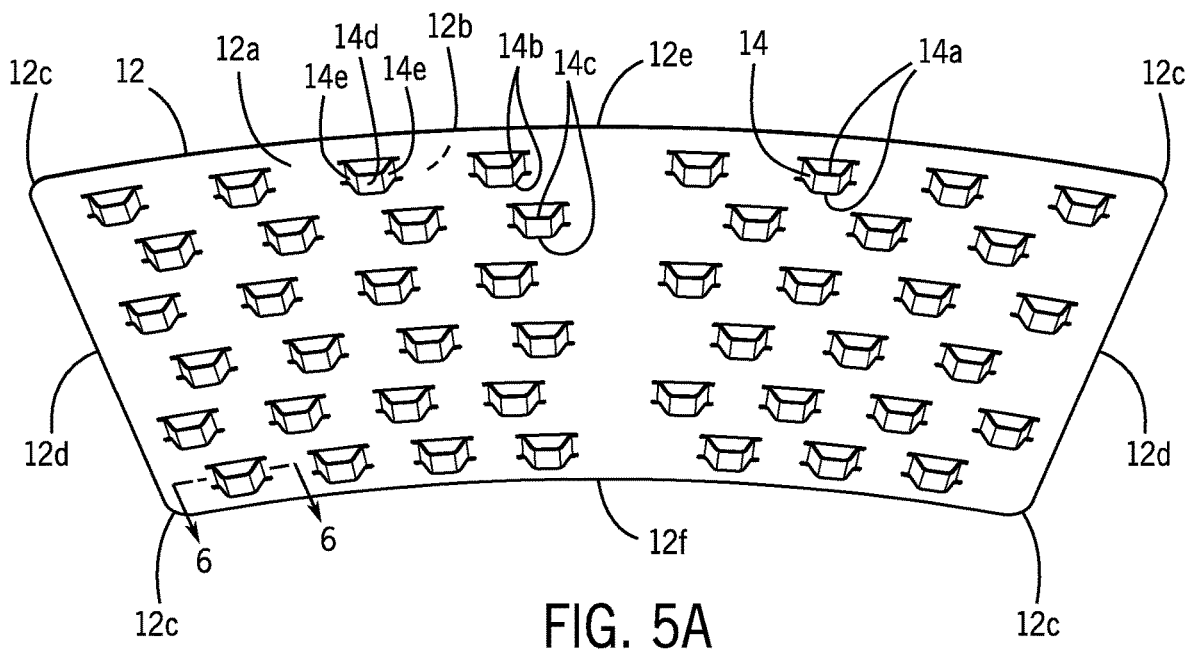
FIG. 5A is a front perspective view of the ice-breaking sleeve, shown in an unbent or flat orientation.
Figure 5B:
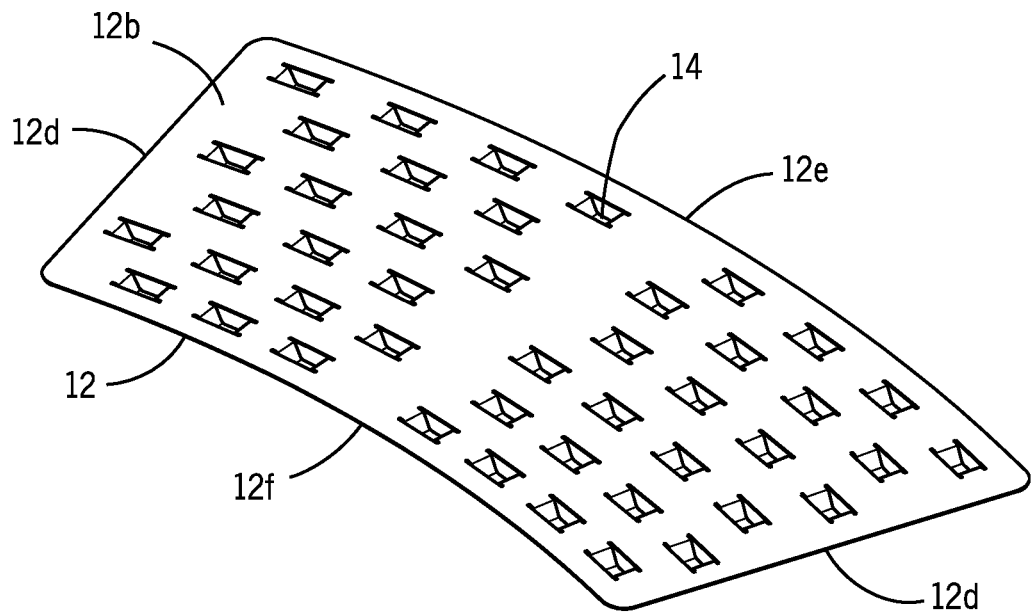
FIG. 5B is a back perspective view of the ice-breaking sleeve, shown in an unbent or flat orientation.

With particular reference to FIGS. 5-8, ice-breaking sleeve 12 may be a bendable sheet, with raised ice shaving elements 14 that protrude outwards from its front surface 12*a*, leaving its back surface 12*b* leveled (see FIG. 5B). In some embodiments, sleeve 12 may be made of a springy material such as metal(s), metal alloys, plastic(s), etc. In some embodiments, the sleeve may be made of a stainless steel, and more specifically from a food grade stainless steel (e.g. 304 food grade stainless steel, which is a type of stainless steel having no more than 0.8 percent carbon and at the very least 50 percent or iron). In some embodiments, sleeve 12 may further have rounded corner edges 12c for user safety and to avoid damage to the container.

In embodiments as best depicted in FIGS. 1 and 2, sleeve 12 is configured to fit and conform to the internal curvature of container 11 and position substantially flush or flatly against the container's interior surface 11a, with its back surface 12b contacting the walls. In some embodiments, sleeve 12 may be configured to span at least 85% or at least 90% of the internal circumference of the container, as determined by its width 'W'. The sleeve may further have a surface area as determined by its height 'H' and width W, configured to support a sufficient number of shaving elements 14 for effective shaving/breaking of the ice, as will be described.

In certain embodiments, the sleeve may be shaped to fit a frusto-conical or tapered cylindrical container, as shown in the figures. To this end, the sleeve may have tapering side edges 12d that conform to the tapering geometry of the container. Additionally, in some embodiments, the top and bottom edges, 12e and 12f, may be rounded to avoid sharp edges and/or to better conform to the geometry of the container.

In embodiments, the sleeve is configured to spring back or expand to press itself up against the interior surface 11a when inserted into the container. This enables the sleeve to remain fixed or held in place within the container during the shaking process, via frictional forces and without additional attachment components. Upon testing, it was determined that the thickness 't1' (see FIG. 8) of the sleeve sheet was a critical element for enabling the sleeve to be bent to fit into the container, and also enabling it to stay in place during the shaking process, without extraneous attachment elements. More specifically, it was discovered that a material which is too thick was unable to be bent into place, while a material which was too thin was unable to hold itself in place. In experimenting with different thickness for a 304 food grade stainless steel, an appropriate thickness for achieving the above stated functionality was found to be between about 0.01 inches and 0.02 inches, or more specifically between about 0.011 inches and 0.015 inches, or about 0.014+/− 0.001 inches for optimal functionality. It is noted that in embodiments, the sleeve may retain a bent shape but may still spring back to press itself up against the interior surface of the container.

In embodiments as best depicted in FIGS. 1-6, raised shaving element 14 may have sharp cutting edges 14a on its top and bottom ends. In certain embodiments, cutting edges 14a may include a combination of rounded cutting edge(s) 14b and straight cutting edges 14c. In embodiments, the rounded cutting edges may be most effective in fracturing of the frozen substance, while the straight edges may be most effective shaving the frozen substance. To this end, each shaving element may comprise a plurality of walls, wherein the edges of each wall provide the straight cutting edges, and the corners where the walls meet provide the rounded cutting edges.

Figure 6:
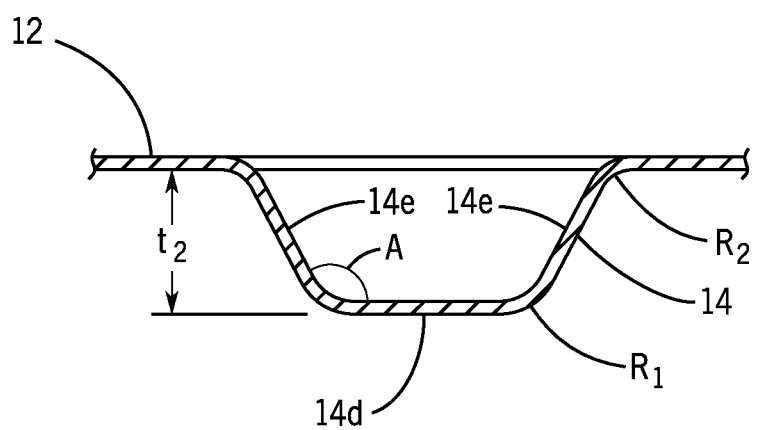
FIG. 6 is a cross-sectional enlarged view taken along line 6-6 of FIG. 5A

According to an exemplary embodiment as depicted in the figures, shaving element 14 may comprise three walls, including a central wall 14d and two side walls 14e extending from the central wall, with rounded corners at their meeting sections. This provides shaving element 14 with three straight cutting edges 14c and two rounded cutting edges, on its top and bottom ends. In some embodiments as best depicted in FIGS. 5A and 6, the side walls 14e may extend at an obtuse angle 'A' from the central wall 14d to form a trapezoidal configuration. According to various embodiments, angle A may be approximately between 110 and 125 degrees, or between 115 and 120 degrees, or at about 117 degrees. It should be appreciated that alternate design configurations, including various number of side walls, attachment angles, and/or geometric shapes for the shaving elements may be employed without departing from the inventive concept. As an example, shaving element 14 may alternately have two side walls that meet at a central point to form triangular configuration, with two cutting edges and one rounded edge.

Figure 7:
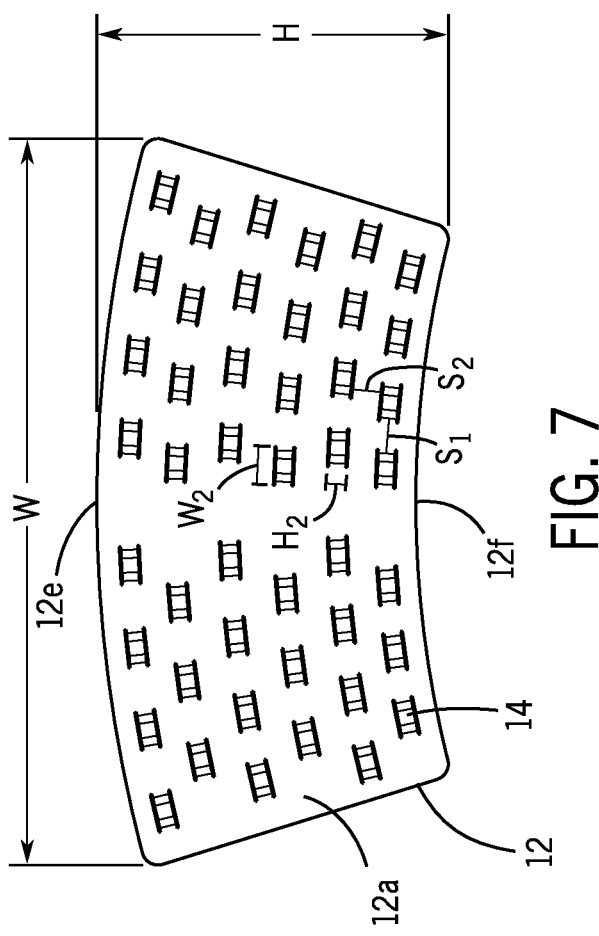
FIG. 7 is a front plan view of the ice-breaking sleeve in the flat orientation.
Figure 8:
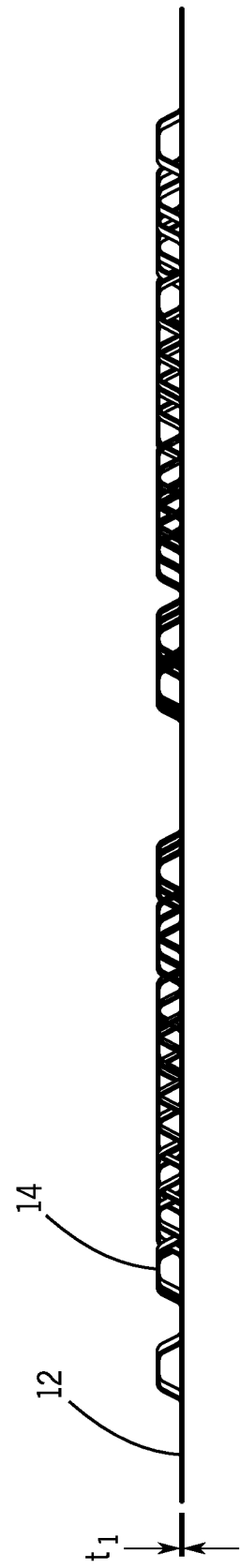
FIG. 8 is a side plan view of the ice-breaking sleeve in the flat orientation.

In embodiments, a plurality of shaving elements 14 may be distributed or spread out in a substantially even manner over sleeve 12 to provide a generally uniform coverage across the sleeve. Additionally, elements 14 may be distanced far enough apart from one another so as to not interfere with the bending and/or elasticity of the sleeve. In some embodiments as depicted in the figures, shaving elements 14 may be arranged in staggered rows across sleeve 12, with lateral and vertical spaces (S1 and S2 as indicated in FIG. 7) between the elements of at least about 0.2 inches to about 0.4 inches, or about 0.3 inches. Additionally, each shaving element may have a height H2 of about 0.2 to about 0.3 inches, or about 0.26 inches; and a width W2 of about 0.2 inches to about 0.8 inches, or about 0.5 inches (see FIG. 7). According to various embodiments, the sleeve may comprise, between about 30 to 60 shaving elements, or between about 40 to 50 shaving elements, or about 44 or 45 shaving elements.

An exemplary sleeve 14 configured for a Boston style shaker having a tapered geometry, as depicted in FIGS. 1-8 may have 44 raised shaving elements. Each shaving element may have a trapezoidal configuration, with an angle 'A' between the central wall and each of the side walls of approximately 117.74 degrees (such that side walls are angled approximately 55.48 degrees with respect to one another). Additionally, the corners of intersection between the side walls and central wall may be rounded, to provide an outer radius 'R1' of about 0.064 degrees; and the corners of intersection between the sleeve and side walls may be rounded to a radius 'R2' of 0.036. Additionally, shaving element 14 may have a width W2 of approximately 0.5 inches, height H2 of approximately 0.26 inches, and a depth t2 of approximately 0.155 inches.

The exemplary sleeve may be configured for Boston shaker, having a volume capacity of about 18-24 oz, and may have a height H of about 4.389 inches, a width W of about 9.438 inches, a top rounded edge 12e having a radius of curvature of about 17.935 degrees, and a bottom rounded edge 12f having a radius of curvature of about 13.795 degrees. In an alternate embodiment, the exemplary sleeve may be configured for a Boston shaker having a volume capacity of about 25-28 oz, and may have a height H of about 4.931 inches, a width W of about 9.808 inches, a top rounded edge 12e having a radius of curvature of about 18.120 degrees, and a bottom rounded edge 12f having a radius of curvature of about 13.613 degrees. In another alternate embodiment, the exemplary sleeve may be configured for Boston shaker having a volume capacity of about 29-31 oz, and may have a height H of about 5.68 inches, a width W of about 10.56 inches, a top rounded edge 12e having a radius of curvature of about 18.50 degrees, and a bottom rounded edge 12f having a radius of curvature of about 13.24 degrees.

The above described exemplary sleeve, may be used with other shakers having a similar volume capacity and geometry. As such, the sleeve may have a universal fit based on the general size and style of the shaker.

It should be appreciated, that the disclosed system may be employed with a variety of different containers, including, but not limited to coffee cups, water bottles, and the like, which may be cylindrical (non-tapered), conical, insulated, non-insulated, etc. Additionally, in some embodiments, the sleeve may be attached to the container, or formed as an integral component therefore.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' approximately, "about," etc., as used herein indicate a deviation of within +/−10% unless otherwise stated. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A device for breaking up frozen substance in a drink, the device comprising:
   a sheet made of a springy material and having a front surface and a back surface; and
       a plurality of shaving elements protruding from the sheet,
   wherein the sheet is configured to orient in a curled configuration for insertion into a container, the container being configured to retain a liquid and having an interior surface and circular cross-section,
       wherein the back surface of the sheet is substantially leveled to permit the sheet to position substantially flat against the interior surface of the container,
   wherein the shaving elements protrude out from the front surface of the sheet in a direction opposite the interior surface of the container when the sheet is inserted into the container,
   wherein the sheet is further configured to expand to press itself up against the interior surface of the container when inserted into the container, such that the sheet retains a fixed position within the container, without extraneous attachment elements, and
   wherein the sheet is capable of retaining said fixed position within the container during shaking of the container without said extraneous attachment elements.

2. The device of claim 1, said sheet being made of stainless steel and having a thickness of between about 0.011 inches and 0.015 inches.

3. The device of claim 2, said sheet having a thickness of about 0.014 inches.

4. The device of claim 1, said sheet comprising tapered side edges and configured to fit a tapered cylindrical container.

5. The device of claim 1, wherein the frozen substance comprises ice.

6. The device of claim 1, wherein each shaving element of the plurality of shaving elements includes at least one rounded cutting edge and at least one straight cutting edge.

7. The device of claim 1, said sheet having a width configured to span at least 85% of said circular cross section.

8. The device of claim 1, wherein the container is a cocktail shaker.

9. The device of claim 1, wherein the plurality of shaving elements comprises from 40 to about 50 shaving elements.

10. The device of claim 1, wherein each shaving element of the plurality of shaving elements includes a combination of rounded cutting edges and straight cutting edges.

11. The device of claim 10, wherein each shaving element is formed from at least two walls, each of said at least two walls comprising top and bottom straight edges, wherein said at least two walls connect to form top and bottom corners therebetween,
   wherein said top and bottom straight edges define the straight cutting edges of each shaving element, and
   wherein said top and bottom corners define the rounded cutting edges of each shaving element.

12. The device of claim 11, wherein said shaving element is formed from 3 walls, including a central wall and two side walls, each of said two side walls extending at an obtuse angle and opposite one another from said central wall.

* * * * *